(12) United States Patent
Mitsuya et al.

(10) Patent No.: US 9,451,577 B2
(45) Date of Patent: Sep. 20, 2016

(54) POSITION INFORMATION PROCESSING DEVICE, POSITION INFORMATION PROCESSING METHOD, PROGRAM, AND POSITION INFORMATION PROCESSING SYSTEM

(75) Inventors: Koshiro Mitsuya, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 752 days.

(21) Appl. No.: 13/425,911

(22) Filed: Mar. 21, 2012

(65) Prior Publication Data

US 2012/0252500 A1 Oct. 4, 2012

(30) Foreign Application Priority Data

Mar. 28, 2011 (JP) ................................. 2011-069839

(51) Int. Cl.
*H04W 64/00* (2009.01)
*H04W 48/12* (2009.01)

(52) U.S. Cl.
CPC ............. *H04W 64/00* (2013.01); *H04W 48/12* (2013.01)

(58) Field of Classification Search
CPC .................................................. H04W 48/12
USPC ........... 455/456.1–456.6, 457, 458, 459, 460
See application file for complete search history.

(56) References Cited

U.S. PATENT DOCUMENTS

| | | | |
|---|---|---|---|
| 7,885,639 B1 * | 2/2011 | Satish et al. .................. | 455/410 |
| 2006/0232472 A1 * | 10/2006 | Roslak .................. | G01S 5/0252 342/457 |
| 2007/0202888 A1 | 8/2007 | Brachet et al. | |
| 2008/0112372 A1 * | 5/2008 | Thomson et al. ............ | 370/338 |
| 2010/0008337 A1 | 1/2010 | Bajko | |
| 2010/0069086 A1 * | 3/2010 | Ahlin ...................... | H04L 67/18 455/456.1 |
| 2010/0103844 A1 | 4/2010 | Kim | |
| 2012/0064912 A1 * | 3/2012 | Oh ............................. | 455/456.1 |
| 2012/0166607 A1 * | 6/2012 | Kitano et al. ................. | 709/223 |
| 2012/0315918 A1 * | 12/2012 | Kadous ....................... | 455/456.1 |
| 2013/0059602 A1 * | 3/2013 | Cho et al. ................... | 455/456.1 |
| 2013/0122932 A1 * | 5/2013 | Patel et al. ................. | 455/456.2 |
| 2013/0172005 A1 * | 7/2013 | Finlow-Bates et al. ... | 455/456.1 |
| 2013/0217414 A1 * | 8/2013 | Nagaraj ..................... | 455/456.2 |
| 2013/0230001 A1 * | 9/2013 | Kimura ......................... | 370/329 |

FOREIGN PATENT DOCUMENTS

EP 1359714 A2 11/2003
JP 2010-273267 A 12/2010

OTHER PUBLICATIONS

European Search Report from EP Application No. 12155763, dated May 30, 2012.

* cited by examiner

*Primary Examiner* — Kwasi Karikari
(74) *Attorney, Agent, or Firm* — Chip Law Group

(57) ABSTRACT

There is provided a position information processing device including a base station information storage section which stores base station information including position information, a MAC address, and an auxiliary identifier, and position information acquisition section which acquires, based on a MAC address of a base station and an auxiliary identifier acquired by reception of a radio signal transmitted from the base station, position information of the base station from the base station information stored in the base station information storage section.

17 Claims, 13 Drawing Sheets

FIG.2

| MAC ADDRESS | POSITION INFORMATION |
|---|---|
| XX-YY-ZZ-UU-VV-WW | P1 |
| XX-YY-ZZ-UU-VV-WW | P2 |
| SS-YY-ZZ-UU-VV-WW | P3 |
| TT-YY-ZZ-UU-VV-WW | P4 |

FIG.6

BASE STATION INFORMATION

| MAC ADDRESS | AUXILIARY IDENTIFIER | POSITION INFORMATION |
|---|---|---|
| XX-YY-ZZ-UU-VV-WW | C1 | P1 |
| XX-YY-ZZ-UU-VV-WW | C2 | P2 |
| SS-YY-ZZ-UU-VV-WW | C3 | P3 |
| TT-YY-ZZ-UU-VV-WW | C4 | P4 |

POSITION INFORMATION PROCESSING DEVICE, POSITION INFORMATION PROCESSING METHOD, PROGRAM, AND POSITION INFORMATION PROCESSING SYSTEM

CROSS-REFERENCE TO RELATED APPLICATION

The present application claims priority from Japanese Patent Application No. JP 2011-069839 filed in the Japanese Patent Office on Mar. 28, 2011, the entire content of which is incorporated herein by reference.

BACKGROUND

The present disclosure relates to a position information processing device, a position information processing method, a program, and a position information processing system.

In recent years, there has been provided a moving object such as an automobile or a mobile phone equipped with a reception device capable of receiving a radio signal transmitted from a satellite. With GPS (Global Positioning System) measurement, the position of the moving object equipped with such a reception device can be estimated. The position estimation technology using such a reception device is an important common base in a wide variety of fields such as navigation, security, and entertainment.

Further, there is also considered position estimation technology, in which a mobile terminal, which performs radio communication with a base station (access point) of a wireless LAN (Local Area Network), measures a signal strength of a signal transmitted from the base station, and a server communicable with a communication device estimates the position of the communication device based on the signal strength. For example, the base station of the wireless LAN transmits a beacon for notifying surroundings of the presence of the base station of the wireless LAN at regular intervals (for example, 5 times/second). The mobile terminal transmits the signal strength of the beacon to the server, and the server can estimate the position of the mobile terminal based on the signal strength and position information of the base station of the wireless LAN that is registered in advance.

According to the position estimation technology described above, since the base stations of the wireless LAN are installed inside a building and underground also, indoor- or underground-position estimation can be performed, which has been difficult to be realized by the position estimation technology based on the GPS measurement. That is, the position estimation technology may be excellent in convenience and simplicity, if base station information indicating a position of the base station of the wireless LAN installed around the mobile terminal is registered in the server. In order to identify the base station from which the received beacon is transmitted, the mobile terminal generally uses technology involving acquiring, from the beacon, a MAC (Media Access Control) address of the base station from which the beacon is transmitted.

Here, it is desirable that a MAC address be uniquely allocated to a base station, however, there is also assumed a case where an identical MAC address is allocated to a plurality of different base stations for some reason. In this case, it is difficult for the mobile terminal to accurately identify a base station from which a beacon is transmitted based on a MAC address included in the beacon. As a result thereof, the server erroneously acquires the position information of the base station from which the beacon is transmitted, and hence, it becomes difficult to accurately estimate the position of the mobile terminal. For example, JP 2010-273267A discloses technology involving detecting a state in which an identical MAC address is set to a plurality of devices.

SUMMARY

However, although the technology disclosed in JP 2010-273267A is adopted, for example, it was difficult to highly accurately acquire position information of a base station in a situation in which an identical MAC address is allocated to a plurality of base stations.

In light of the foregoing, it is desirable to provide a position information processing device, a position information processing method, a program and a position information processing system, which are novel and improved, and which are capable of highly accurately acquiring position information of a base station in a situation in which an identical MAC address is allocated to a plurality of base stations.

According to an embodiment of the present disclosure, there is provided a position information processing device which includes a base station information storage section which stores base station information including position information, a MAC address, and an auxiliary identifier, and a position information acquisition section which acquires, based on a MAC address of a base station and an auxiliary identifier acquired by reception of a radio signal transmitted from the base station, position information of the base station from the base station information stored in the base station information storage section.

The position information acquisition section may acquire the position information of the base station from the base station information including a MAC address and an auxiliary identifier which correspond to or are similar to the MAC address of the base station and the auxiliary identifier acquired by reception of the radio signal.

The auxiliary identifier may be an area identifier indicating an area in which the base station is located.

The auxiliary identifier may be an ESSID of the base station.

The auxiliary identifier may indicate a radio wave pattern of a radio signal transmitted from another base station, which is received together with the radio signal transmitted from the base station.

The position information processing device may further include a positioning section which estimates a position of the position information processing device, based on the position information of the base station acquired by the position information acquisition section.

The position information processing device may further include a reception section which receives the radio signal transmitted from the base station, a MAC address acquisition section which acquires the MAC address of the base station from the radio signal received by the reception section, and an auxiliary identifier acquisition section which acquires the auxiliary identifier based on a result of reception by the reception section of the radio signal.

The position information processing device may further include a reception section which receives the MAC address of the base station and the auxiliary identifier from a mobile terminal which received the radio signal transmitted from the base station.

According to another embodiment of the present disclosure, there is provided a position information processing method which includes storing base station information including position information, a MAC address, and an auxiliary identifier, and acquiring, based on a MAC address of a base station and an auxiliary identifier acquired by reception of a radio signal transmitted from the base station, position information of the base station from the stored base station information.

According to another embodiment of the present disclosure, there is provided a program for causing a computer to function as a position information processing device including a base station information storage section which stores base station information including position information, a MAC address, and an auxiliary identifier, and a position information acquisition section which acquires, based on a MAC address of a base station and an auxiliary identifier acquired by reception of a radio signal transmitted from the base station, position information of the base station from the base station information stored in the base station information storage section.

According to another embodiment of the present disclosure, there is provided a position information processing system including a mobile terminal which includes a reception section which receives a radio signal transmitted from a base station, a MAC address acquisition section which acquires a MAC address of the base station from the radio signal received by the reception section, and an auxiliary identifier acquisition section which acquires an auxiliary identifier based on a result of reception by the reception section of the radio signal, and a position information processing device which includes a base station information storage section which stores base station information including position information, a MAC address, and an auxiliary identifier, a communication section which receives the MAC address of the base station and the auxiliary identifier from the mobile terminal, and a position information acquisition section which acquires, based on the MAC address of the base station and the auxiliary identifier received by the communication section, position information of the base station from the base station information stored in the base station information storage section.

According to the embodiments of the present disclosure described above, it is possible to highly accurately acquire position information of a base station in a situation in which an identical MAC address is allocated to a plurality of base stations.

BRIEF DESCRIPTION OF THE DRAWINGS

FIG. 2 is a diagram showing a configuration example of base station information according to a comparative example;

FIG. 6 is a diagram showing a configuration example of base station information according to the first embodiment;

DETAILED DESCRIPTION OF THE EMBODIMENT(S)

Figure 1:
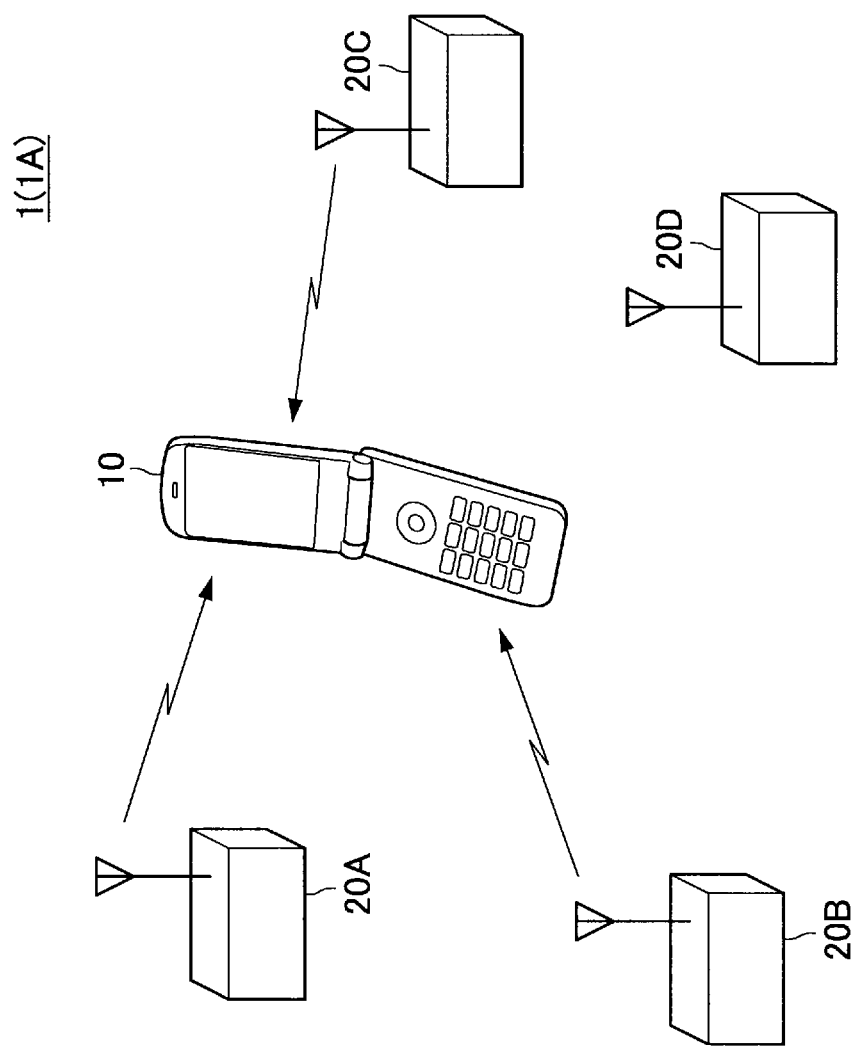
FIG. 1 is a diagram showing a configuration of a position information processing system according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numerals. Note that, in the case where it is not necessary to distinguish the multiple structural elements that have substantially the same function and structure from one another, the multiple structural elements are denoted with the same reference numeral only.

Further, the "detailed description of the embodiments" will be described in the following order.

1. Description of each embodiment
  1-1. First embodiment
    (Configuration of position information processing system)
    (Acquisition of position information in comparative example)
    (Configuration of position information processing device according to present embodiment)
  1-2. Second embodiment
    (Configuration of position information processing system)
    (Configuration of position information processing device according to present embodiment)
2. Hardware configuration of position information processing device
3. Conclusion 1. Description of Each Embodiment Hereinafter, with reference to FIGS. 1 to 13, each embodiment according to the present disclosure will be described in detail.

1-1. First Embodiment (Configuration of Position Information Processing System)

First, a position information processing system according to a first embodiment of the present disclosure will be described. The position information processing system according to the present embodiment has notable characteristics in a mobile terminal (position information processing device) which configures the position information processing system. Hereinafter, description will be made using FIGS. 1 to 10.

FIG. 1 is a diagram showing a configuration of a position information processing system 1A according to the present embodiment. As shown in FIG. 1, the position information processing system 1A includes a mobile terminal 10.

A base station 20 relays communication between spatially scattered mobile terminals. For example, the base station 20 can relay radio communication between the mobile terminal 10 and another mobile terminal (not shown) which are placed within each other's radio wave reachable range, and can relay communication between the mobile terminal 10 and a communication device connected to the base station 20 through wire. Specifically, the base station 20 may be a base station of a wireless LAN (Local Area Network) based on a WiFi (Wireless Fidelity) standard, a base station of GSM (Global System for Mobile Communications), or may be a base station of the Bluetooth.

The base station 20 can periodically transmit a beacon signal to notify surroundings of the presence of the base station 20, in addition to a signal that is transmitted when the base station 20 relays radio communication. The beacon signal includes a base station ID serving as base station identification information that is uniquely assigned to the base station 20, for example. As a result, based on the base station ID of the received beacon signal, the mobile terminal 10 can confirm the presence of the base station 20 that exists in the surrounding area. The MAC address may be used as the base station ID.

The mobile terminal 10 can transmit and receive various types of data based on the radio communication controlled by the base station 20. For example, the mobile terminal 10 can receive content data from a content distribution server (not shown) via the base station 20. Further, for example, the mobile terminal 10 can transmit and receive e-mails to/from another mobile terminal (not shown). Note that the content data may include music data such as music, a lecture, and a radio program, video data such as a film, a television program, a video program, a photograph, a painting, and a diagram, and any other data, such as a game and software.

Further, the mobile terminal 10 may also be an information processing apparatus such as a PC (Personal Computer), a home video processing device (such as a DVD recorder or a video deck), a mobile phone, a PHS (Personal Handyphone System), a mobile music playback device, a mobile video processing device, a PDA (Personal Digital Assistant), a home game console, a mobile game console, and a household electrical appliance.

The mobile terminal 10 stores in advance base station information in which position information indicating a position at which the base station 20 is installed is associated with the base station ID, and has a function to estimate the position of the mobile terminal 10 using, for example, the triangulation principle, based on the signal strength information received from the base station 20 and on the above-mentioned base station information.

Further, in the case where a new base station 20 is installed or in the case where the position of the base station 20 is changed, the mobile terminal 10 according to the present embodiment may update contents of the stored base station information by following an actual installation position of the base station 20.

In the case where the MAC address is used as the base station ID, when the mobile terminal 10 receives the MAC address from the base station 20, the mobile terminal 10 can acquire the position information of the base station 20 based on the MAC address. However, several issues are caused when the position information of the base station 20 is acquired based on the MAC address received from the base station 20. Hereinafter, with reference to FIGS. 2 to 4, those issues will be briefly described.

(Acquisition of Position Information in Comparative Example)

FIG. 2 is a diagram showing a configuration example of base station information according to a comparative example. As shown in FIG. 2, pieces of position information of base stations 20A to 20D are represented by "P1" to "P4", respectively. Further, the MAC address of the base station 20A and the MAC address of the base station 20B are each represented by "XX-YY-ZZ-UU-VV-WW", the MAC address of the base station 20C is represented by "SS-YY-ZZ-UU-VV-WW", and the MAC address of the base station 20D is represented by "TT-YY-ZZ-UU-VV-WW".

As the base stations 20A and 20B shown in this example, there is a case where an identical MAC address is allocated to a plurality of different base stations 20 for some reason. Such a duplication of MAC address is a phenomenon found by an actual investigation. Taking as an example the investigation results obtained while going through a highway one round on in City B of Country A, 2981 base stations 20 were observed in one round, and out of those, MAC addresses of 256 base stations 20 were duplicate with MAC addresses of other base stations 20. This corresponds to about 8.5% of all base stations 20 that are installed in City B.

Further, the duplication of MAC address was also observed in a plurality of observation points which were placed within no more than 500 m. In addition, in a plurality of observation points which were placed within 1 km, MAC address of 164 base stations 20 were duplicate with MAC addresses of other base stations 20. This corresponds to about 5.5% of all base stations 20 that are installed in City B. In this way, in the case where an identical MAC address is allocated to a plurality of base stations 20, accurate position information of a base station 20 may not be acquired, and the positioning accuracy of the mobile terminal may be lowered. The reason therefor will be described in further detail with reference to FIG. 3.

Figure 3:
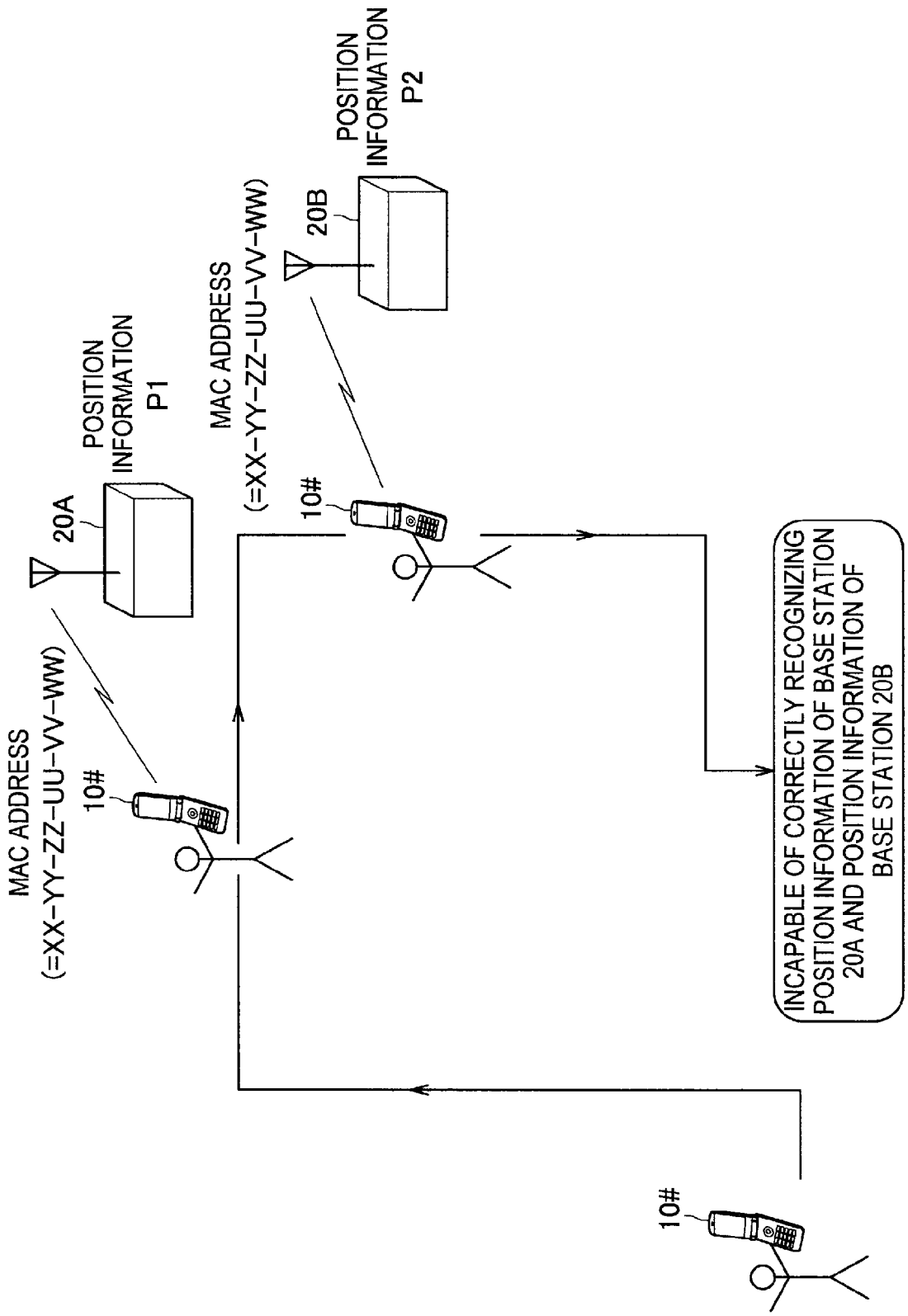
FIG. 3 is an explanatory diagram showing an example of acquiring position information of a base station according to the comparative example.

FIG. 3 is an explanatory diagram showing an example of acquiring position information of a base station according to the comparative example. For example, let us assume that a mobile terminal 10# is in a state storing therein the base station information shown in FIG. 2, and that a user holding the mobile terminal 10# moves along a route shown in FIG. 3. Note that, as shown in FIG. 3, although the identical MAC address "XX-YY-ZZ-UU-VV-WW" is allocated to each of the base station 20A and the base station 20B, it is assumed that the position information of the base station 20A is "P1" and the position information of the base station 20B is "P2".

First, let us assume that the user approaches the base station 20A and the mobile terminal 10# acquires the MAC address "XX-YY-ZZ-UU-VV-WW" from the base station 20A installed at the position indicated by the position information P1. In this case, the mobile terminal 10# attempts to identify the position of the base station 20A based on the acquired MAC address "XX-YY-ZZ-UU-VV- WW", but, since the base station information has "P1" and "P2" registered therein as the position information of the base station 20A, "P1", which is the correct position information, may not be acquired.

Subsequently, let us assume that the user approaches the base station 20B and the mobile terminal 10# acquires the MAC address "XX-YY-ZZ-UU-VV-WW" from the base station 20B installed at the position indicated by the position information P2. In this case, the mobile terminal 10# attempts to identify the position of the base station 20B based on the acquired MAC address "XX-YY-ZZ-UU-VV-WW", but, since the base station information has "P1" and "P2" registered therein as the position information of the base station 20B, "P2", which is the correct position information, may not be acquired.

As the example shown in FIG. 3, in the case where the identical MAC address is allocated to the base stations 20A and 20B, the position information of the base station 20A and the position information of the base station 20B may not be correctly recognized. Further, if the position information base station 20 cannot be accurately acquired, there is a possibility that the positioning accuracy of the mobile terminal 10# based on the position information of the base station 20 may be lowered. A flow of position estimation according to the comparative example will be described with reference to FIG. 4.

Figure 4:
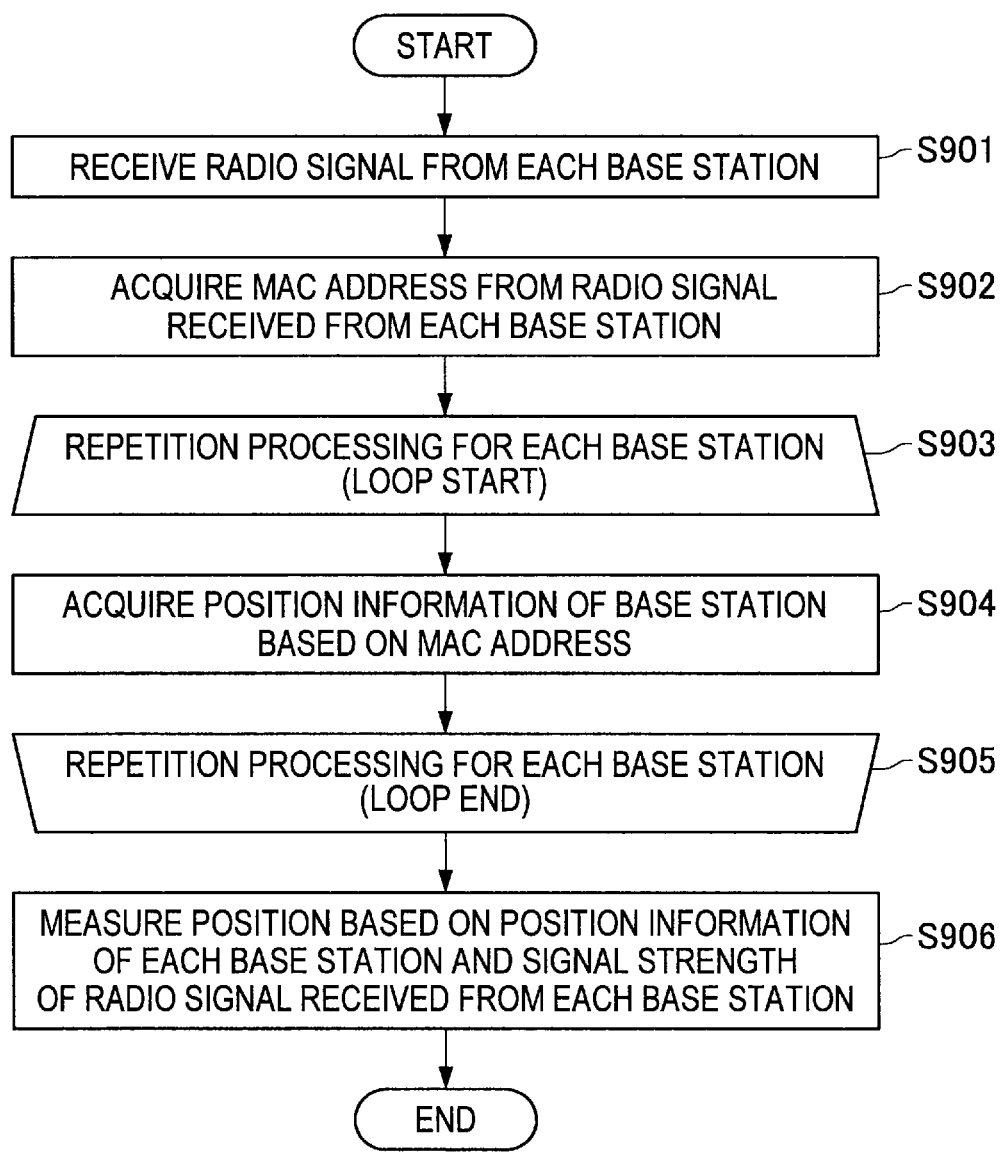
FIG. 4 is a flowchart showing a flow of position estimation according to the comparative example.

FIG. 4 is a flowchart showing a flow of position estimation according to the comparative example. As shown in FIG. 4, the mobile terminal 10# receives a radio signal from each base station 20 (S901), and acquires a MAC address from the radio signal received from each base station 20 (S902). The mobile terminal 10# executes repetition processing (S903 to S905) with respect to each base station 20. In the repetition processing (S903 to S905), the mobile terminal 10# acquires the position information of the base station 20 based on the MAC address acquired from each base station 20 (S904).

After the mobile terminal 10# executes the repetition processing (S903 to S905) with respect to each base station 20, the mobile terminal 10# measures a position based on the position information of each base station 20 and the signal strength of the radio signal received from each base station 20 (S906). However, as described above, in the case where an identical MAC address is allocated to a plurality of different base stations 20, the position information of the base station 20 may not be accurately acquired in S904. As a result thereof, in S906, there may be a possibility that the positioning accuracy of the mobile terminal 10# based on the position information of the base station 20 may be lowered.

Accordingly, each embodiment of the present disclosure has been made in view of the circumstances described above. According to each embodiment of the present disclosure, even in the situation in which an identical MAC address is allocated to a plurality of base stations 20, position information of a base station 20 can be highly accurately acquired, since an auxiliary identifier is used which plays an auxiliary role with respect to the MAC address. Therefore, the positioning accuracy of the mobile terminal 10 can be improved. Hereinafter, each embodiment of the present disclosure will be described in detail.

(Configuration of Position Information Processing Device According to Present Embodiment)

Figure 5:
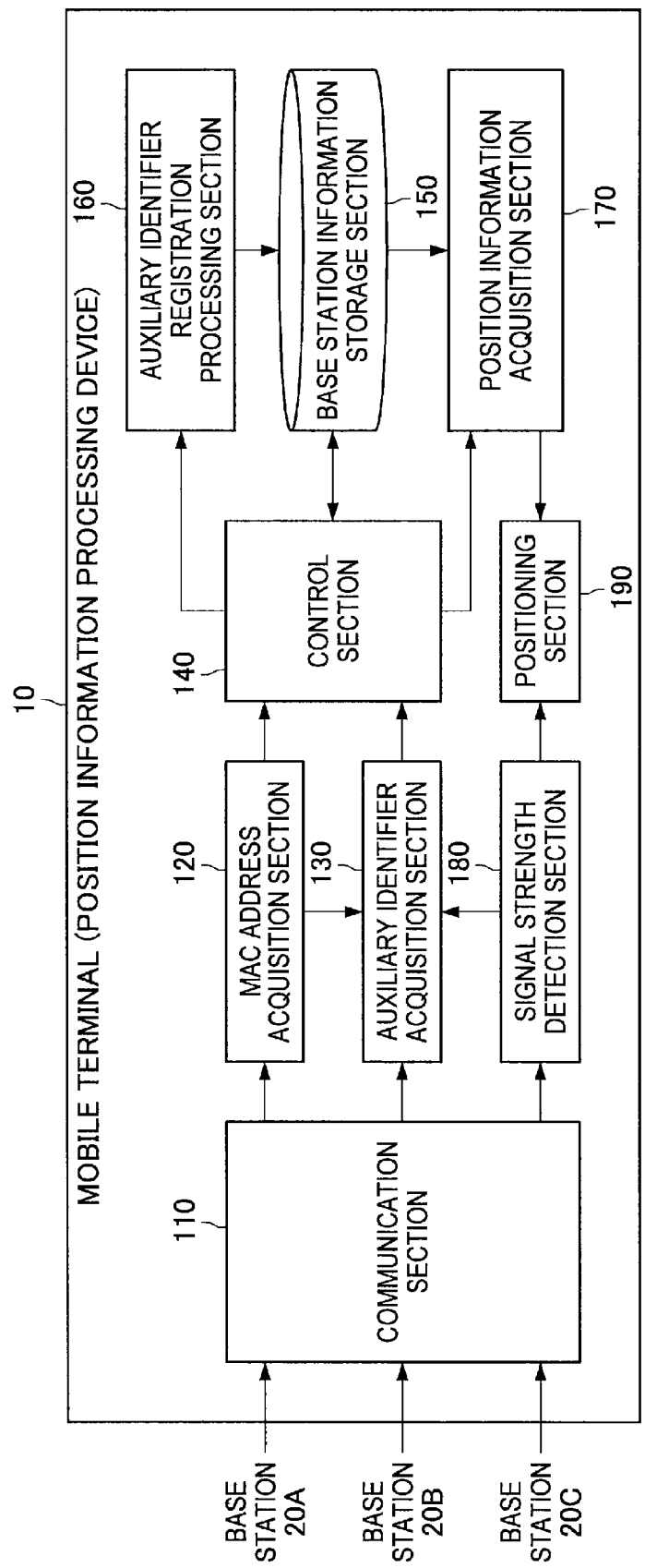
FIG. 5 is a functional block diagram showing a configuration of a mobile terminal according to the first embodiment.

FIG. 5 is a functional block diagram showing a configuration of the mobile terminal 10 according to the present embodiment. As shown in FIG. 5, the mobile terminal according to the present embodiment includes a communication section 110, a MAC address acquisition section 120, an auxiliary identifier acquisition section 130, a control section 140, a base station information storage section 150, an auxiliary identifier registration processing section 160, a position information acquisition section 170, a signal strength detection section 180, and a positioning section 190.

The base station information storage section 150 is configured from a magnetic storage device such as an HDD (Hard Disk Drive), a semiconductor storage device, an optical storage device, or a magneto-optical storage device, for example, and has a function of storing base station information. The base station information will be described with reference to FIG. 6. FIG. 6 is a diagram showing a configuration example of base station information according to the present embodiment. As shown in FIG. 6, the base station information includes a MAC address, an auxiliary identifier, and position information. The form of the position information is not limited to the latitude/longitude, and may also be in the form of XY-coordinates, in the form of polar coordinates, or in the form of a vector, for example.

The MAC address and the position information may be registered in advance in the base station information storage section 150. For example, when a base station 20 is installed, a combination of the MAC address of the base station 20 and the position information of the base station 20 may be registered in the base station information storage section 150 with a predetermined operation input by a user or the like. Further, in the stage in which the position of the base station 20 is measured, the combination of the MAC address of the base station 20 and the position information of the base station 20 acquired by the positioning may be registered in the base station information storage section 150.

The position of the base station 20 can be measured by the positioning section 190. That is, for example, in the case where the position of the mobile terminal 10 is measured by the positioning section 190 while a radio signal from the base station 20 is being received by the communication section 110, a combination of the MAC address acquired from the radio signal received by the communication section 110 and the position information acquired by measuring the position of the mobile terminal 10 may be registered in the base station information storage section 150. The auxiliary identifier included in the base station information may be registered in advance in the base station information storage section 150, or, as will be described later, may be registered in the base station information storage section 150 by the auxiliary identifier registration processing section 160.

Returning to FIG. 5, the description of the configuration of the mobile terminal 10 will be continued. The communication section 110 has a function as a reception section for receiving a radio signal (for example, beacon signal) transmitted by a surrounding base station 20 or the like, for example. The communication section 110 may be a wireless LAN enabled communication device, a GSM enabled communication device, or a Bluetooth enabled communication device.

The signal strength detection section 180 has a function of detecting the signal strength of the radio signal received by the communication section 110 from the base station 20. The signal strength detected by the signal strength detection section 180 may be provided to the positioning section 190. Further, the signal strength detected by the signal strength detection section 180 may be provided to the auxiliary identifier acquisition section 130.

The MAC address acquisition section 120 is configured from a CPU (Central Processing Unit), a ROM (Read Only Memory), and a RAM (Random Access Memory), for example, and has a function of acquiring a MAC address for identifying the base station 20 from the radio signal received by the communication section 110 from the base station 20. As described above, in the present embodiment, since there is assumed the situation in which an identical MAC address is allocated to a plurality of different base stations 20, there may be a case where MAC addresses acquired from radio signals received from a plurality of different base stations 20 are the same as each other.

The auxiliary identifier acquisition section 130 is configured from a CPU, a ROM, and a RAM, for example, and has a function of acquiring an auxiliary identifier based on a result of reception by the communication section 110 of the radio signal. As the auxiliary identifier acquisition technique performed by the auxiliary identifier acquisition section 130, various techniques can be adopted. As a first example, there is given a technique of acquiring an area identifier indicating the area in which the base station 20 is located as the auxiliary identifier.

As the area identifier acquisition technique, various techniques can be adopted. For example, in the case where an area identifier is included in the radio signal transmitted from the base station 20, the auxiliary identifier acquisition section 130 may acquire, as the auxiliary identifier, the area identifier from the radio signal received by the communication section 110 from the base station 20. Further, if the auxiliary identifier acquisition section 130 is capable of accepting from a user an input of an area identifier indicating the area in which the base station 20 is located, the auxiliary identifier acquisition section 130 may acquire, as the auxiliary identifier, the area identifier input by the user.

Examples of the area identifier indicating the area in which the base station 20 is located may include an identifier for identifying a country in which the base station 20 is located, and information indicating an area smaller than a country, such as a state and a city.

As a second example, there is given a technique of acquiring an ESSID (Extended Service Set IDentifier) of the base station 20 as the auxiliary identifier. For example, in the case where an ESSID is included in the radio signal transmitted from the base station 20, the auxiliary identifier acquisition section 130 can acquire, as the auxiliary identifier, the ESSID from the radio signal received by the communication section 110 from the base station 20.

As a third example, there is given a technique of acquiring, as the auxiliary identifier, a radio wave pattern of a radio signal transmitted from another base station 20, which is received together with the radio signal transmitted from the base station 20. The third example will be described with reference to FIG. 7.

Figure 7:
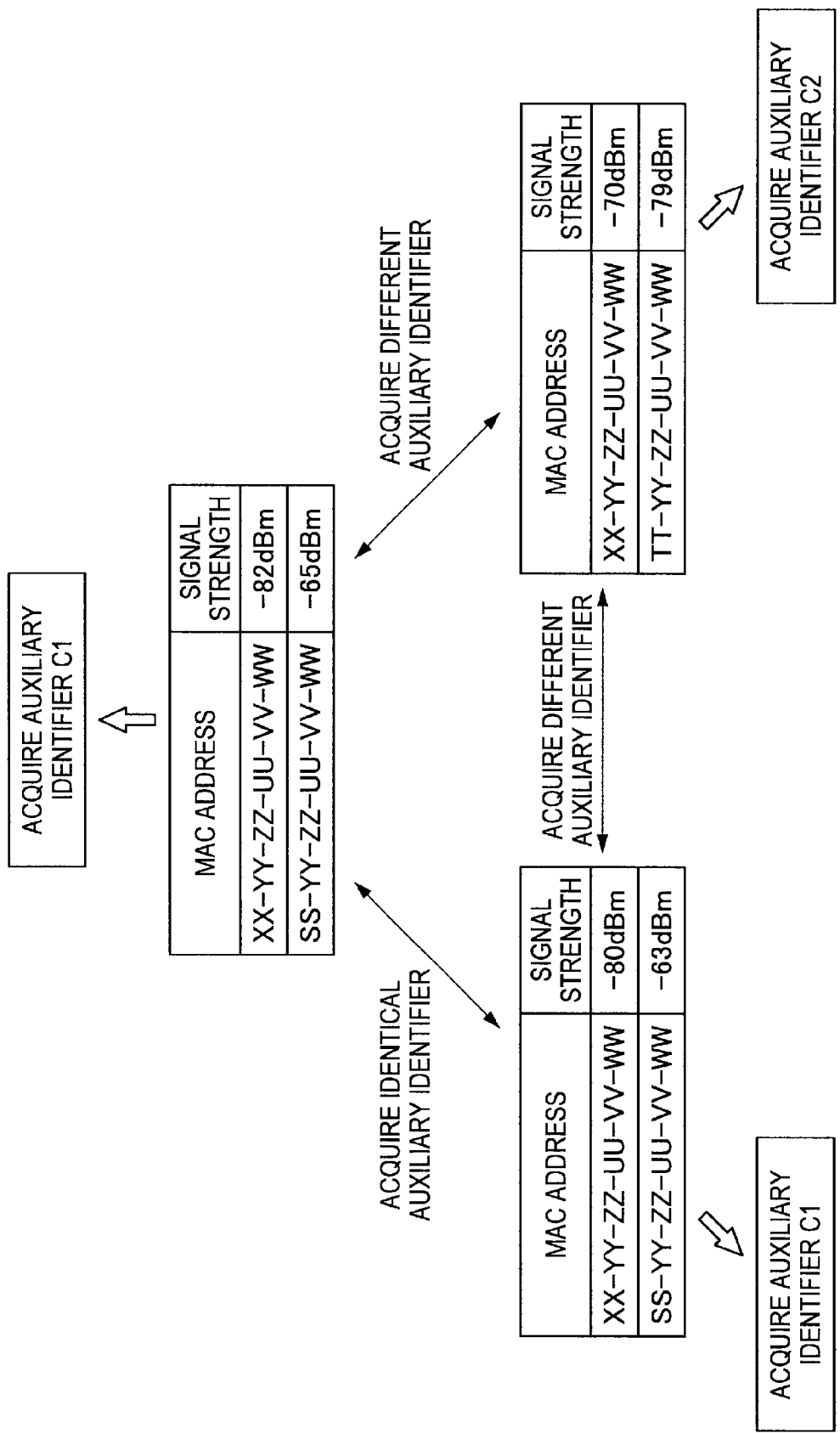
FIG. 7 is an explanatory diagram showing an example of an auxiliary identifier acquisition technique according to the first embodiment.

FIG. 7 is an explanatory diagram showing the third example of the auxiliary identifier acquisition technique according to the present embodiment. As shown in FIG. 7, at each of three points, a MAC address "XX-YY-ZZ-UU-VV-WW" is acquired from a received radio signal, and the signal strengths of the radio signals at the three points are detected as "−82 dBm", "−80 dBm", and "−70 dBm", respectively. In this case, since the identical MAC address is acquired from the radio signal received at each of the three points, the auxiliary identifier acquisition section 130 compares therewith a MAC address acquired from another radio signal.

As shown in FIG. 7, "SS-YY-ZZ-UU-VV-WW" is acquired as the MAC address from another radio signal, at each of a first point and a second point, and the signal strengths of the radio signals at the first point and the second point are detected as "−65 dBm" and "−63 dBm", respectively. In this case, since the identical MAC address is acquired from the other radio signal received at each of the first point and the second point, the auxiliary identifier acquisition section 130 acquires an identical auxiliary identifier C1 for each of the first point and the second point.

On the other hand, "TT-YY-ZZ-UU-VV-WW" is acquired as the MAC address from another radio signal at a third point, and the signal strength of the radio signal is detected as "−79 dBm". In this case, since the MAC address acquired from the other radio signal received at the third point is different from the MAC address acquired from the other radio signal received at each of the first point and the second point, the auxiliary identifier acquisition section 130 acquires an auxiliary identifier C2 for the third point, which is different from that for each of the first point and the second point.

In this way, in the case where a radio signal is transmitted from another base station 20 together with the radio signal transmitted from the base station 20, the auxiliary identifier acquisition section 130 can recognize, as the radio wave pattern, the combination of the MAC address acquired from the radio signal transmitted from the base station 20 and the MAC address acquired from the radio signal transmitted from the other base station 20, and can acquire a different auxiliary identifier for each radio wave pattern.

Further, the radio wave pattern may be recognized by taking into consideration the signal strength of the radio signal transmitted from the other base station 20, in addition to the MAC address acquired from the radio signal transmitted from the other base station 20. For example, the signal strengths of the radio signals transmitted from the other base station 20 at the first point and the second point are detected as "−65 dBm" and "−63 dBm", respectively, and whether or not the radio wave patterns thereof are the same as each other may be determined in accordance with the difference between the two signal strengths.

That is, in the case where the difference between the two signal strengths is less than a predetermined value, it may be determined that the radio wave patterns are the same as each other, and in the case where the difference between the two signal strengths exceeds the predetermined value, it may be determined that the radio wave patterns differ from each other. In the case where the difference between the two signal strengths equals the predetermined value, it may be determined in either way. Note that, in the example shown in FIG. 7, the mobile terminal 10 receives, together with the radio signal transmitted from the base station 20, a radio signal transmitted from one of the other base stations 20, but the mobile terminal 10 may also receive radio signals transmitted from a plurality of other base stations 20 and recognize the radio wave pattern from the radio signals received from the plurality of other base stations 20.

The control section 140 is configured from a CPU, a ROM, and a RAM, for example, and has a function of determining whether the auxiliary identifier acquired by the auxiliary identifier acquisition section 130 is stored in the base station information storage section 150. In the case where it is determined that the auxiliary identifier is stored in the base station information storage section 150, the control section 140 causes the position information acquisition section 170 to acquire position information, and in the case where it is determined that the auxiliary identifier is not stored in the base station information storage section 150, the control section 140 causes the auxiliary identifier registration processing section 160 to perform processing of registering the auxiliary identifier.

The position information acquisition section 170 is configured from a CPU, a ROM, and a RAM, for example, and has a function of acquiring the position information of the base station 20 from the base station information stored in the base station information storage section 150, based on the MAC address of the base station 20 and the auxiliary identifier acquired by the reception of the radio signal transmitted from the base station 20. As described above, the MAC address of the base station 20 may be acquired by the MAC address acquisition section 120, for example. Further, the auxiliary identifier may be acquired by the auxiliary identifier acquisition section 130.

The position information acquisition section 170 can acquire the position information of the base station 20 from the base station information including a MAC address and an auxiliary identifier that correspond to or are similar to the MAC address of the base station 20 and the auxiliary identifier, which are acquired by the reception of the radio signal. The position information acquisition section 170 can acquire, for example, the MAC address and the auxiliary identifier that correspond to or are similar to the MAC address acquired by the MAC address acquisition section 120 and the auxiliary identifier acquired by the auxiliary identifier acquisition section 130, from the base station information stored in the base station information storage section 150.

The range in which it is similar to the MAC address of the base station 20 and the auxiliary identifier may be set in advance. For example, if a predetermined part of the MAC address acquired by the MAC address acquisition section 120 corresponds to a predetermined part of the MAC address stored in the base station information storage section 150, it can be considered that they are similar to each other. Further, for example, if a predetermined part of the auxiliary identifier acquired by the auxiliary identifier acquisition section 130 corresponds to a predetermined part of the auxiliary identifier stored in the base station information storage section 150, it can be considered that they are similar to each other.

The auxiliary identifier registration processing section 160 is configured from a CPU, a ROM, and a RAM, for example, and has a function of registering the auxiliary identifier in the base station information storage section 150. For example, as described above, in the case where the position of the mobile terminal 10 is measured by the positioning section 190, the auxiliary identifier registration processing section 160 can register the combination of the MAC address acquired by the MAC address acquisition section 120, the position information acquired by measuring the position of the mobile terminal 10, and the auxiliary identifier acquired by the auxiliary identifier acquisition section 130, in the base station information storage section 150 as the base station information.

The positioning section 190 is configured from a CPU, a ROM, and a RAM, for example, and has a function of estimating the position of the mobile terminal 10 based on the position information of the base station 20 acquired by the position information acquisition section 170. Note that the positioning section 190 may be provided to the mobile terminal 10, or may be provided to a device other than the mobile terminal 10. The positioning section 190 can estimate the position of the mobile terminal 10 using the triangulation principle, based on the strengths of the radio signals received from the base stations 20A to 20C and the base station information. The triangulation principle will be described with reference to FIG. 8.

Figure 8:
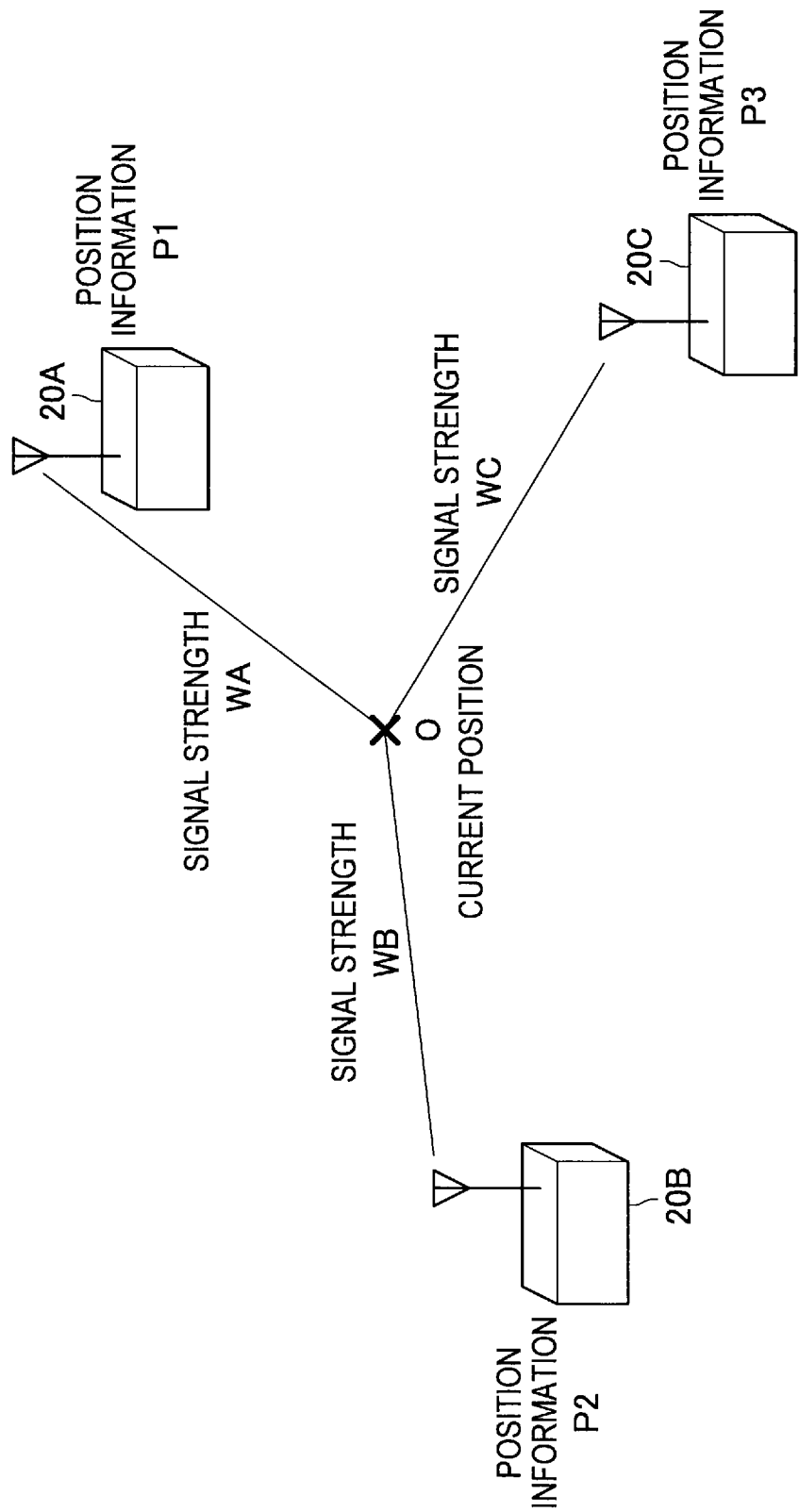
FIG. 8 is an explanatory diagram showing an example of a positioning technique according to the first embodiment.

FIG. 8 is an explanatory diagram showing an example of a positioning technique according to the present embodiment. In FIG. 8, in order to simplify the description, there is shown an example in which the positioning section 190 estimates a current position O of the mobile terminal 10 based on strengths (WA, WB, and WC) of signals transmitted from the respective base stations 20A to 20C and pieces of position information P1 to P3 of the respective base stations 20A to 20C, but the number of base stations 20 is not particularly limited. That is, for example, the positioning section 190 can estimate the current position O of the mobile terminal 10 according to the following Equations 1 to 3.

$$O = \frac{1}{W} \cdot \sum_i (Wi \cdot Ai) \qquad \text{(Equation 1)}$$

$$Wi = \frac{1}{d(2Oi)} \qquad \text{(Equation 2)}$$

$$W = \sum_i Wi \qquad \text{(Equation 3)}$$

In Equation 1, Ai represents position information of an i-th base station which is registered in the base station information stored in the base station information storage section 150. Accordingly, in the case where the position information is shown in a longitude/latitude format, Equation 1 is applied to each longitude/latitude. Further, as shown in Equation 2, Wi represents a weighting factor, which is obtained based on an estimated distance d(20i) between the mobile terminal 10 and a base station 20i that is estimated from the signal strength. Further, as shown in Equation 3, W represents a sum of weighting factors.

Referring to Equation 1, position information of a base station 20 having a small d(20i) is reflected largely on the current position O of the mobile terminal 10. On the other hand, position information of a base station 20 having large a large d(20i) has a little influence on the current position O of the mobile terminal 10. By using such Equation 1, the positioning section 190 can rationally estimate the current position O of the mobile terminal 10.

Note that the method of measuring the position of the mobile terminal 10 is not limited to the method that uses the above-mentioned Equation 1, and, for example, a position of a base station 20 from which a signal is transmitted, the signal being received by the mobile terminal 10 with the highest signal strength, may be estimated as the position of the mobile terminal 10. That is, the positioning section 190 may set the position information of the base station 20 acquired by the position information acquisition section 170 may be set as the position of the mobile terminal 10, for example. Further, a position of the center of base stations from which signals are transmitted, the signals being received by the mobile terminal 10 with signal strengths each having a predetermined threshold or more, may be estimated as the position of the mobile terminal 10.

Figure 9:
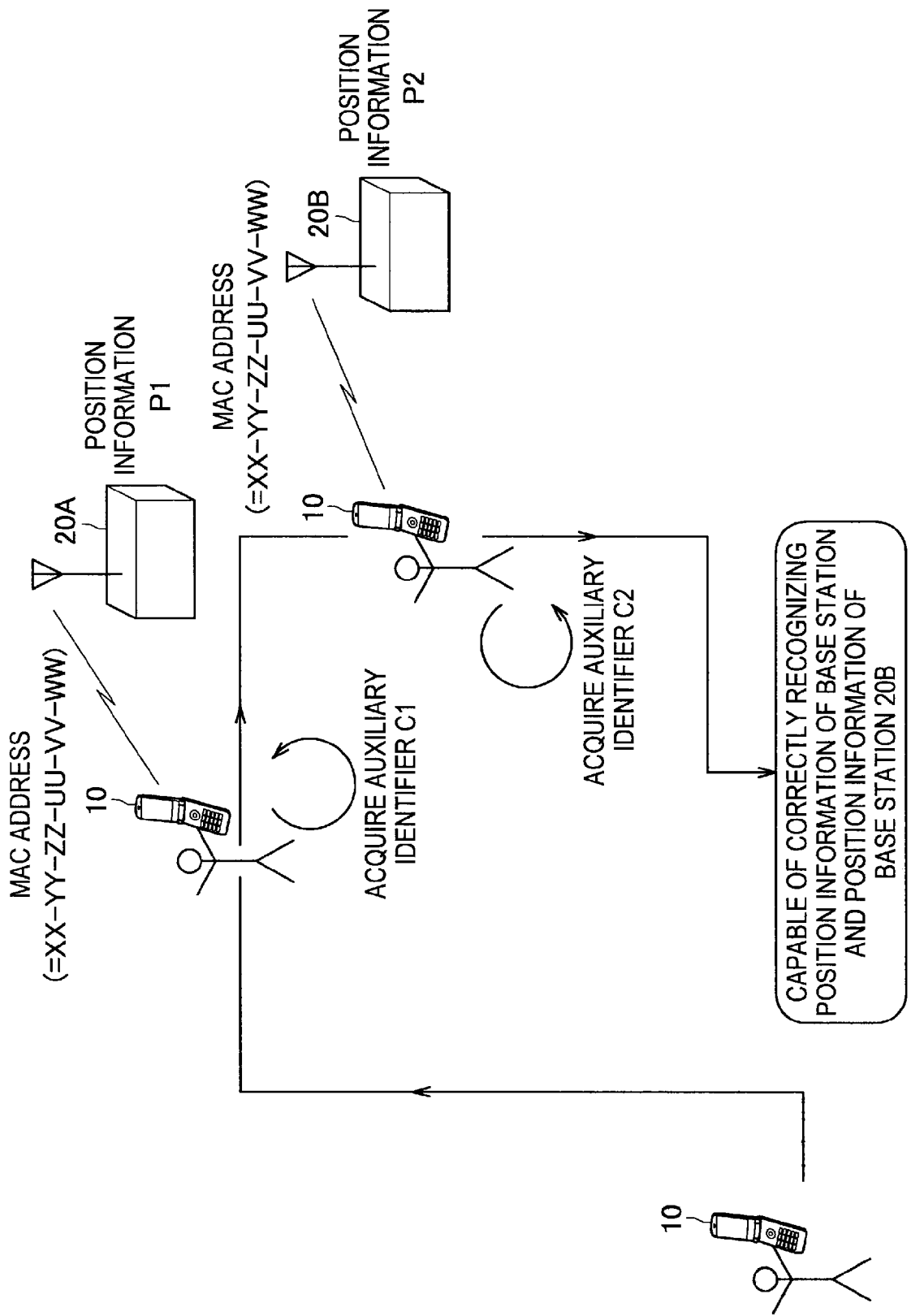
FIG. 9 is an explanatory diagram showing an example of acquiring position information of a base station according to the first embodiment.

FIG. 9 is an explanatory diagram showing an example of acquiring position information of a base station 20 according to the present embodiment. For example, let us assume that the mobile terminal 10 is in a state storing therein the base station information shown in FIG. 6, and that a user holding the mobile terminal 10 moves along a route shown in FIG. 9. Note that, as shown in FIG. 9, although the identical MAC address "XX-YY-ZZ-UU-VV-WW" is allocated to each of the base station 20A and the base station 20B, it is assumed that the position information of the base station 20A is "P1" and the position information of the base station 20B is "P2".

First, let us assume that the user approaches the base station 20A and the mobile terminal 10 acquires the MAC address "XX-YY-ZZ-UU-VV-WW" from the base station 20A installed at the position indicated by the position information P1. In this case, the mobile terminal 10 acquires an auxiliary identifier C1 based on the acquired MAC address "XX-YY-ZZ-UU-VV-WW". The mobile terminal 10 attempts to identify the position of the base station 20A based on the MAC address "XX-YY-ZZ-UU-VV-WW" and the auxiliary identifier C1. In the base station information, the position information P1 is registered by being associated with the MAC address "XX-YY-ZZ-UU-VV-WW" and the auxiliary identifier C1, and therefore, "P1", which is the correct position information of the base station 20A, can be acquired.

Subsequently, let us assume that the user approaches the base station 20B and the mobile terminal 10 acquires the MAC address "XX-YY-ZZ-UU-VV-WW" from the base station 20B installed at the position indicated by the position information P2. In this case, the mobile terminal 10 acquires an auxiliary identifier C2 based on the acquired MAC address "XX-YY-ZZ-UU-VV-WW". The mobile terminal 10 attempts to identify the position of the base station 20B based on the MAC address "XX-YY-ZZ-UU-VV-WW" and the auxiliary identifier C2. In the base station information, the position information P2 is registered by being associated with the MAC address "XX-YY-ZZ-UU-VV-WW" and the auxiliary identifier C2, and therefore, "P2", which is the correct position information of the base station 20B, can be acquired.

As the example shown in FIG. 9, according to the present embodiment, even in the case where the identical MAC address is allocated to the base stations 20A and 20B, the position information of the base station 20A and the position information of the base station 20B can be correctly recognized. Further, since the position information of the base station 20 can be correctly recognized, the positioning accuracy of the mobile terminal 10 based on the position information of the base station 20 can be improved. A flow of the position estimation according to the present embodiment will be described with reference to FIG. 10.

Figure 10:
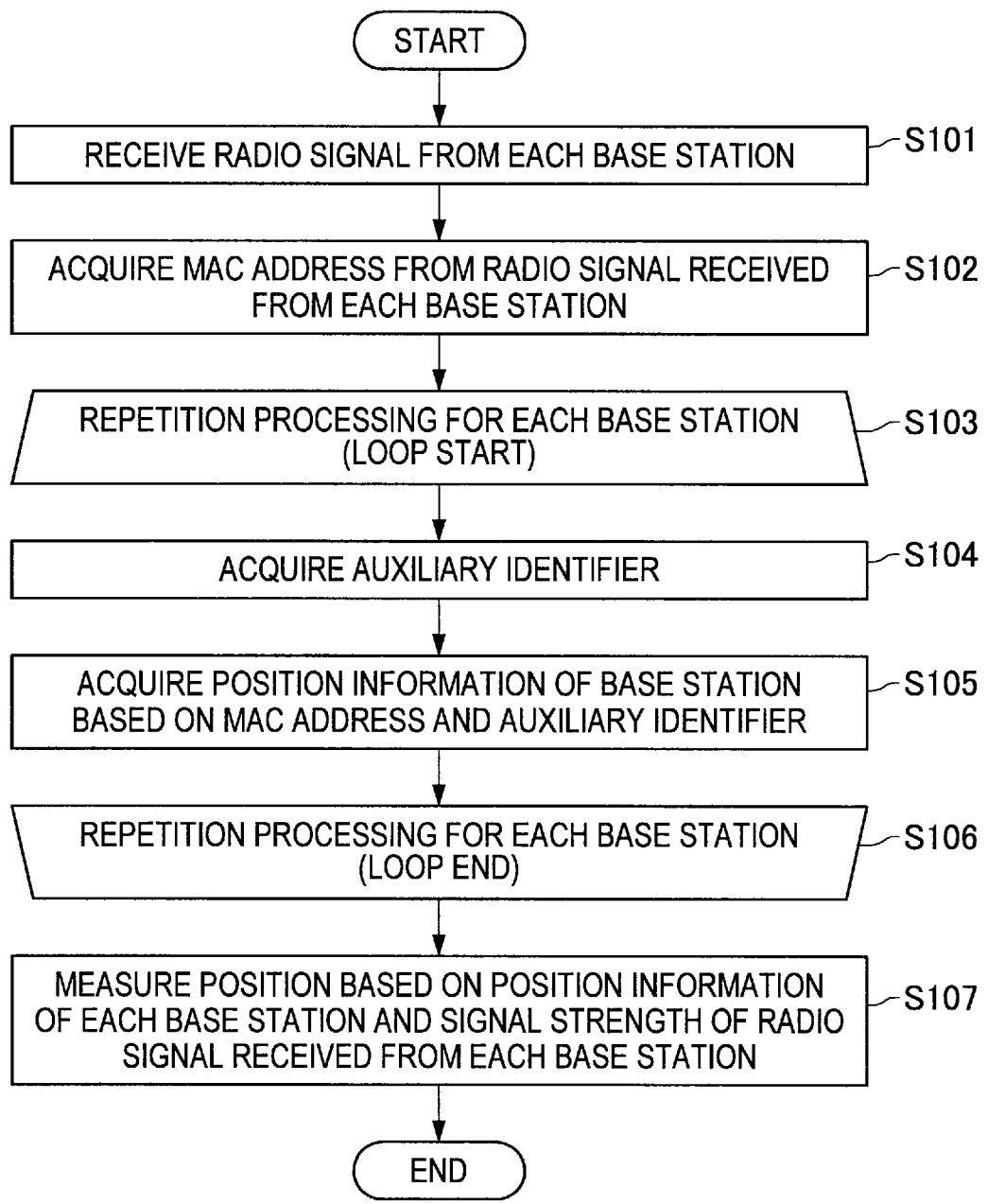
FIG. 10 is a flowchart showing a flow of position estimation according to the first embodiment.

FIG. 10 is a flowchart showing a flow of position estimation according to the present embodiment. As shown in FIG. 10, the mobile terminal 10 receives a radio signal from each base station 20 (S101), and acquires a MAC address from the radio signal received from each base station 20 (S102). The mobile terminal 10 executes repetition processing (S103 to S106) with respect to each base station 20. In the repetition processing (S103 to S106), the mobile terminal 10 acquires an auxiliary identifier based on a result of reception of the radio signal (S104), and acquires the position information of the base station 20 based on the MAC address and the auxiliary identifier acquired from each base station 20 (S105).

After the mobile terminal 10 executes the repetition processing (S103 to S106) with respect to each base station 20, the mobile terminal 10 measures a position based on the position information of each base station 20 and the signal strength of the radio signal received from each base station 20 (S107). According to such position estimation, even if an identical MAC address is allocated to a plurality of different base stations 20 as described above, correct position information of the base station 20 can be acquired in S105. As a result thereof, in S107, the positioning accuracy of the mobile terminal 10 based on the position information of the base station 20 can be improved.

1-2. Second Embodiment

Heretofore, the first embodiment of the present disclosure has been described. Next, with reference to FIG. 11 and FIG. 12, a second embodiment of the present disclosure will be described.

(Configuration of Position Information Processing System)

Figure 11:
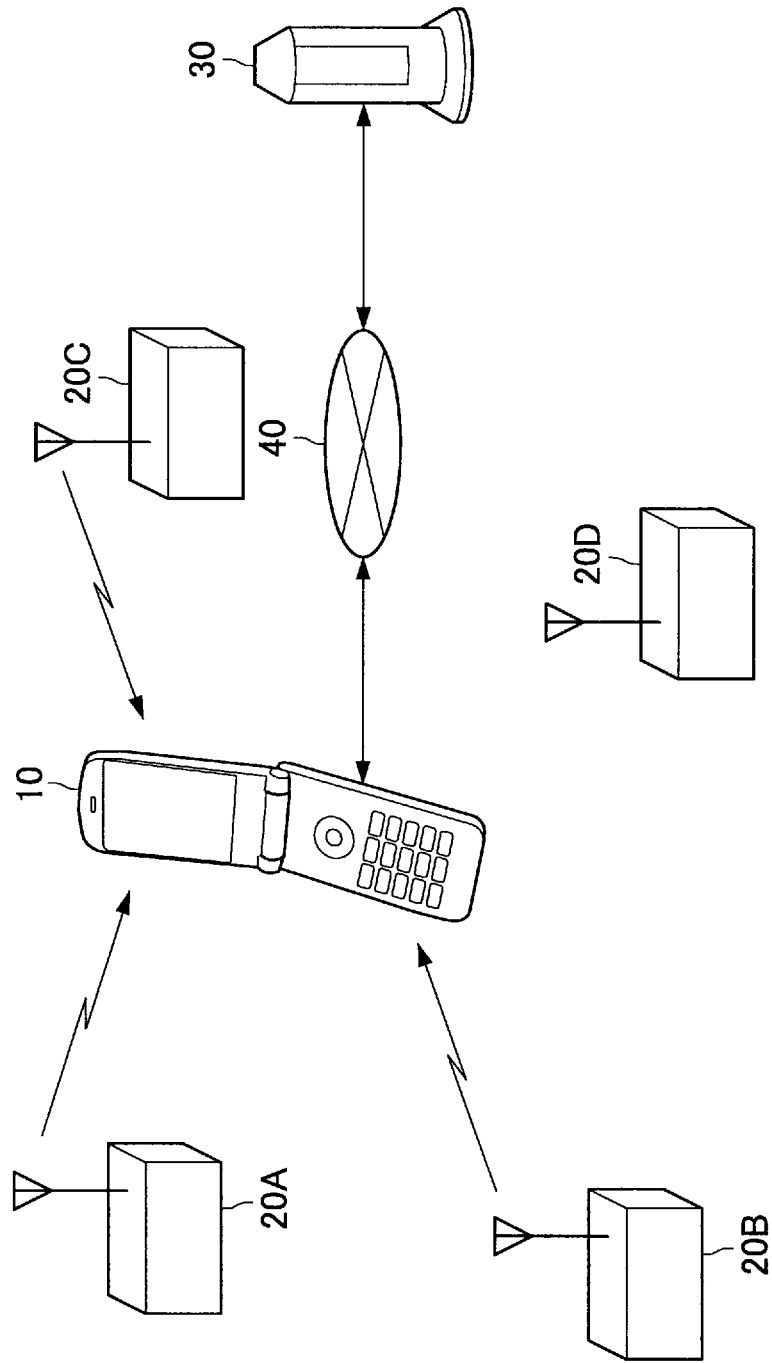
FIG. 11 is a diagram showing a configuration of a position information processing system according to a second embodiment.

FIG. 11 is a diagram showing a configuration of a position information processing system 1B according to the second embodiment of the present disclosure. As shown in FIG. 11, a mobile terminal 10 according to the second embodiment can communicate with a server (position information processing device) 30 via a network 40.

The network 40 is a wired or wireless transmission path for information transmitted from an apparatus connected to the network 40. For example, the network 40 may include a public line network such as the Internet, a telephone line network, and a satellite communication network, and a leased line network such as various types of LAN (Local Area Network), including Ethernet (registered trademark), WAN (Wide Area Network), and IP-VPN (Internet Protocol-Virtual Private Network).

(Configuration of Position Information Processing Device According to Present Embodiment)

Figure 12:
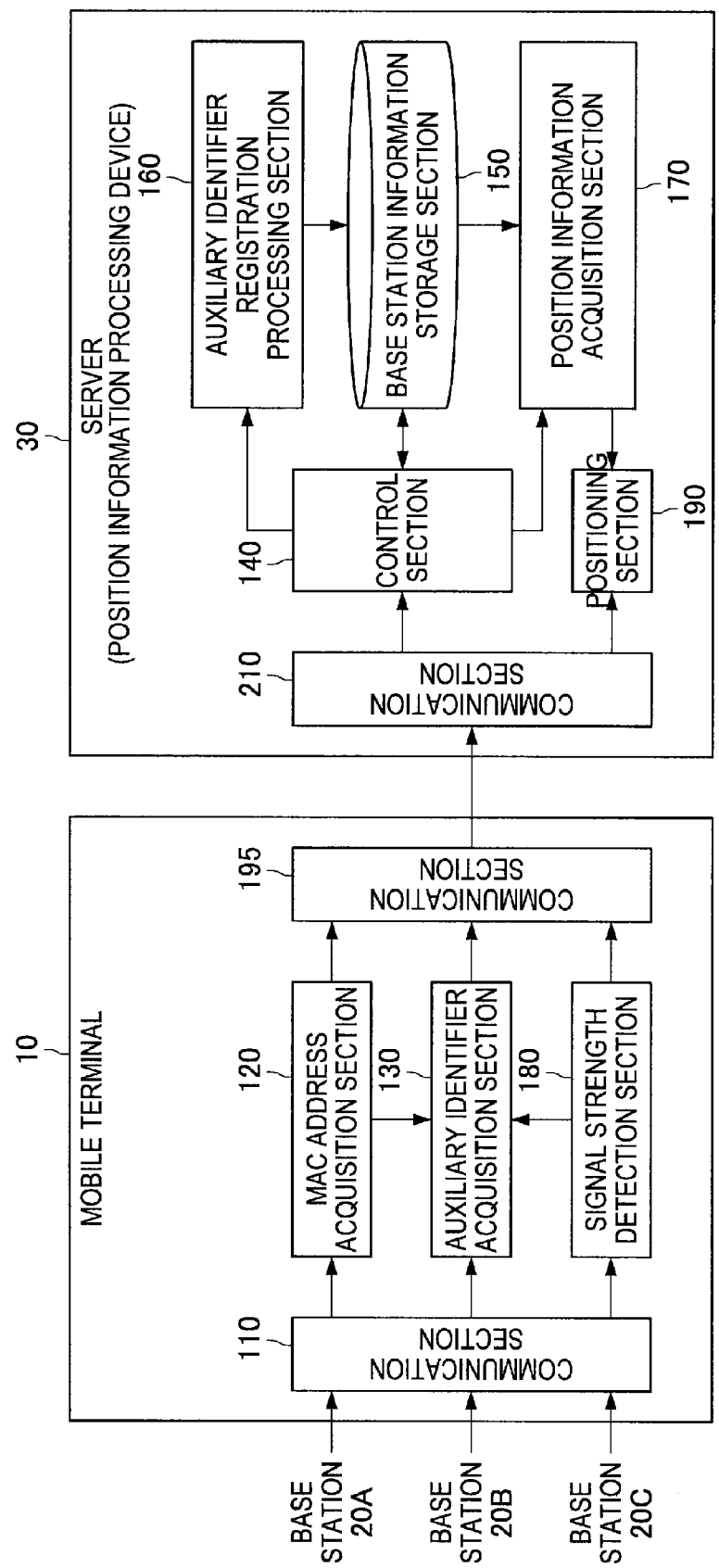
FIG. 12 is a functional block diagram showing a configuration of each of a mobile terminal and a server according to the second embodiment.

FIG. 12 is a functional block diagram showing a configuration of each of a mobile terminal and a server according to the present embodiment. As shown in FIG. 12, the mobile terminal 10 according to the present embodiment includes the communication section 110, the MAC address acquisition section 120, the auxiliary identifier acquisition section 130, and the signal strength detection section 180, which have been described in the first embodiment, and additionally includes a communication section 195. On the other hand, the server 30 according to the present embodiment includes the control section 140, the base station information storage section 150, the auxiliary identifier registration processing section 160, the position information acquisition section 170, and the positioning section 190, which have been described in the first embodiment, and additionally includes a communication section 210.

The communication section 195 of the mobile terminal 10 can communicate with the server 30 via the network 40. For example, the communication section 195 can function as a transmission section for transmitting a MAC address acquired by the MAC address acquisition section 120, an auxiliary identifier acquired by the auxiliary identifier acquisition section 130, and a signal strength detected by the signal strength detection section 180, to the server 30. The blocks of the communication section 110, the MAC address acquisition section 120, the auxiliary identifier acquisition section 130, and the signal strength detection section 180 have functions that are the same as the respective functions of the blocks described in the first embodiment.

The communication section 210 of the server 30 can communicate with the mobile terminal 10 via the network 40. The communication section 210 can function as a reception section for receiving the MAC address, the auxiliary identifier, and the signal strength, which are transmitted from the mobile terminal 10, for example. The blocks of the control section 140, the base station information storage section 150, the auxiliary identifier registration processing section 160, the position information acquisition section 170, and the positioning section 190 have functions that are the same as the respective functions of the blocks described in the first embodiment.

As described above, according to the present embodiment, even in the situation in which an identical MAC address is allocated to a plurality of base stations 20, position information of a base station 20 can be highly accurately acquired, in the same manner as in the first embodiment. Therefore, the positioning accuracy of the mobile terminal 10 can be improved. Further, even in the case where there are a plurality of mobile terminals 10, it is not necessary that base station information be stored for each mobile terminal 10. The base station information is collectively stored in the server 30, and hence, hardware resources can be used effectively.

2. Hardware Configuration of Position Information Processing Device

Figure 13:
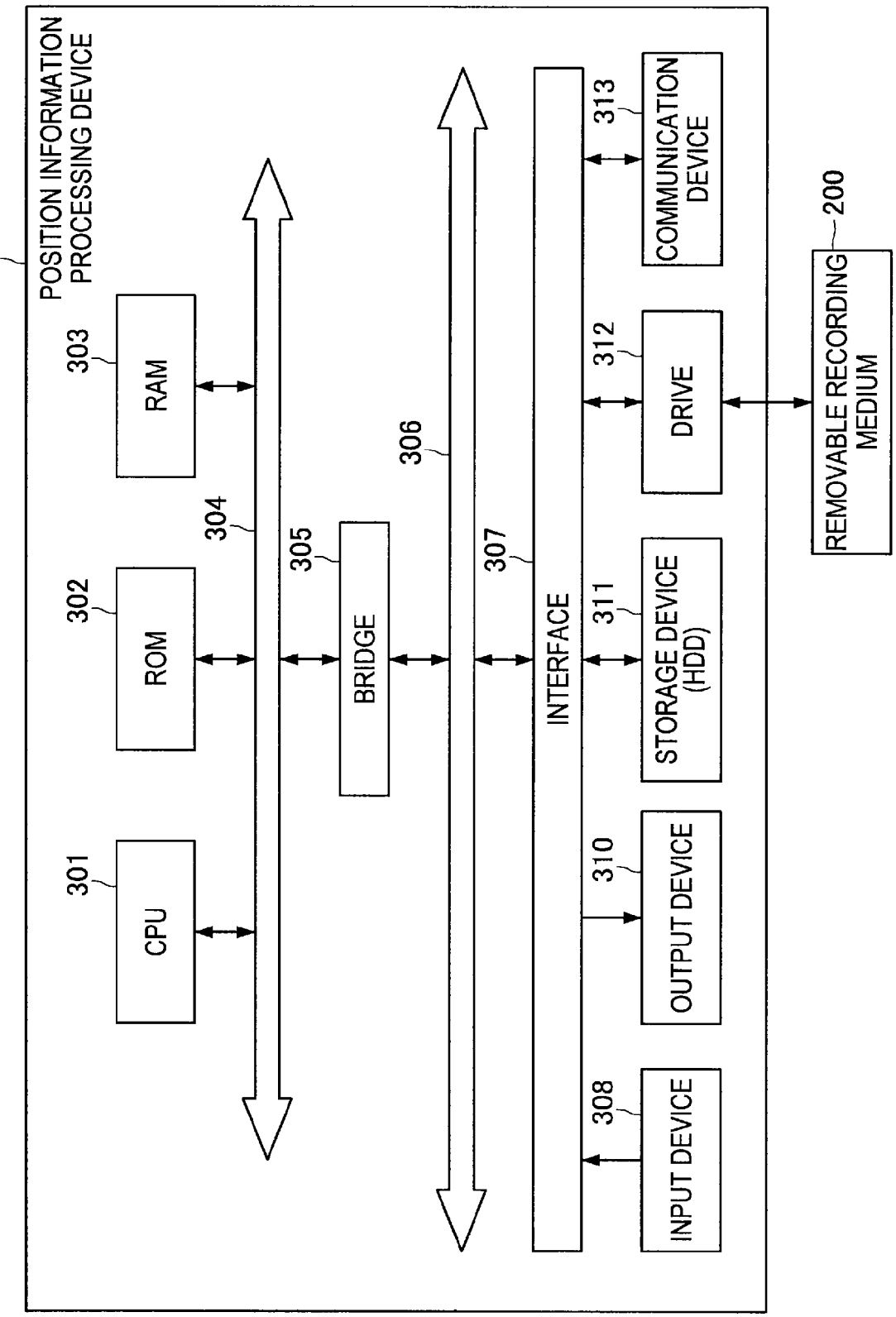
FIG. 13 is a block diagram showing a hardware configuration of the position information processing device.

FIG. 13 is a block diagram showing a hardware configuration of the position information processing device 10, 30. The position information processing device 10, 30 includes a CPU 301, a ROM 302, a RAM 303, and a host bus 304. Further, the position information processing device 10, 30 includes a bridge 305, an external bus 306, an interface 307, an input device 308, an output device 310, a storage device (HDD) 311, a drive 312, and a communication device 313.

The CPU 301 functions as an arithmetic processing unit and a control unit, and controls entire operation of the position information processing device 10, 30 in accordance with various programs. Further, the CPU 301 may be a microprocessor. The ROM 302 stores a program, a calculation parameter, and the like used by the CPU 301. The RAM 303 temporarily stores a program used in execution of the CPU 301, a parameter varying as appropriate during the execution, and the like. They are connected with each other via the host bus 304 configured from a CPU bus or the like.

The host bus 304 is connected to the external bus 306 such as a PCI (Peripheral Component Interconnect/Interface) bus via the bridge 305. Note that it is not necessary that the host bus 304, the bridge 305, and the external bus 306 be configured separately, and the functions thereof may be implemented in one bus.

The input device 308 is configured from, for example, input means for inputting information by a user, such as a mouse, a keyboard, a touch panel, a button, a microphone, a switch, and a lever, and an input control circuit which generates an input signal based on the input by the user and outputs the generated input signal to the CPU 301. The user of the position information processing device 10, 30 can input various kinds of data to the position information processing device 10, 30 and can instruct the position information processing device 10, 30 to perform a processing operation by operating the input device 308.

The output device 310 includes, for example, display devices such as a CRT (Cathode Ray Tube) display device, a liquid crystal display (LCD) device, an OLED (Organic Light Emitting Diode) device, and a lamp. In addition, the output device 310 includes, for example, an audio output device such as a speaker and headphones. The output device 310 outputs reproduced content, for example. Specifically, the display device displays, in the form of texts or images, various types of information such as reproduced video data. On the other hand, the audio output device outputs converts reproduced audio data or the like into audio and outputs the audio.

The storage device 311 is an example of a storage section of the position information processing device 10, 30 according to the present embodiment, and is configured as an example of a device for storing data. The storage device 311 may include, for example, a storage medium, a recording device for recording data in the storage medium, a reading device for reading out the data from the storage medium, and a deletion device for deleting the data recorded in the storage medium. The storage device 311 is configured from an HDD (Hard Disk Drive), for example. The storage device 311 drives a hard disk and stores a program and various data executed by the CPU 301.

The drive 312 is a reader/writer for the storage medium and is built in or externally attached to the position information processing device 10, 30. The drive 312 reads out information recorded in a removable recording medium 200 which is mounted thereto, such as a magnetic disk, an optical disc, a magneto-optical disk, or a semiconductor memory, and outputs the information to the RAM 303. Further, the drive 312 can also write information on the removable recording medium 200.

The communication device 313 is a communication interface which is configured from, for example, a communication device for establishing a connection with a surrounding base station 20. In addition, the communication device 313 may be a wireless LAN (Local Area Network) enabled communication device, a LTE (Long Term Evolution) enabled communication device, or a wired communication device for performing wired communication.

3. Conclusion

As described above, according to the position information processing system 1 according to each embodiment of the present disclosure, even in the situation in which an identical MAC address is allocated to a plurality of base stations 20, position information of a base station 20 can be highly accurately acquired, since an auxiliary identifier is used which plays an auxiliary role with respect to the MAC address. Therefore, the positioning accuracy of the mobile terminal 10 can be improved.

It should be understood by those skilled in the art that various modifications, combinations, sub-combinations and alterations may occur depending on design requirements and other factors insofar as they are within the scope of the appended claims or the equivalents thereof.

Further, respective steps included in the processing of the position information processing system 1 of the present specification are not necessarily processed in chronological order in accordance with the flowcharts. For example, the respective steps included in the processing of the position information processing system 1 may be processed in different order from the flowcharts, or may be processed in a parallel manner.

Further, it is also possible to create a computer program for causing hardware built in the position information processing device 10, 30, such as the CPU 301, the ROM 302, and the RAM 303, to exhibit functions equivalent to the functions of the respective structures of the position information processing device 10, 30 described above. Further, there is also provided a recording medium having the computer program stored therein.

What is claimed is:
1. A position information processing device comprising:
a base station information storage section which stores base station information including position information, a MAC address, and an auxiliary identifier;

a position information acquisition section which acquires, by utilizing both a MAC address of a base station and an auxiliary identifier acquired by reception of a radio signal transmitted from the base station, position information of the base station from the base station information stored in the base station information storage section;

a positioning section which estimates a position of the position information processing device based on the position information of the base station acquired by the position information acquisition section; and wherein the position of the position information processing device is estimated as a position of a center of positions of a plurality of base stations each having a signal strength of radio signal, received by the position information processing device, greater than a threshold.

2. The position information processing device according to claim 1, wherein the position information acquisition section acquires the position information of the base station from the base station information including a MAC address and an auxiliary identifier which correspond to or are similar to the MAC address of the base station and the auxiliary identifier acquired by reception of the radio signal.

3. The position information processing device according to claim 2, wherein the auxiliary identifier is an area identifier indicating an area in which the base station is located.

4. The position information processing device according to claim 2, wherein the auxiliary identifier is an ESSID of the base station.

5. The position information processing device according to claim 2, wherein the auxiliary identifier indicates a radio wave pattern of a radio signal transmitted from another base station, which is received together with the radio signal transmitted from the base station.

6. The position information processing device according to claim 1, further comprising:

a reception section which receives the radio signal transmitted from the base station;

a MAC address acquisition section which acquires the MAC address of the base station from the radio signal received by the reception section; and an auxiliary identifier acquisition section which acquires the auxiliary identifier based on a result of reception by the reception section of the radio signal.

7. The position information processing device according to claim 1, further comprising:

a reception section which receives the MAC address of the base station and the auxiliary identifier from a mobile terminal which received the radio signal transmitted from the base station.

8. The position information processing device according to claim 1, wherein the auxiliary identifier is an area identifier indicating an area in which the base station is located, and wherein the area identifier is input by a user.

9. The position information processing device according to claim 1, wherein the position information included in the base station information stored in the base station information storage section is updated based on the acquired position information of the base station by reception of the radio signal transmitted from the base station.

10. The position information processing device according to claim 1, wherein the auxiliary identifier indicates a signal strength of a radio signal transmitted from another base station, and wherein the radio signal transmitted from another base station is received together with the radio signal transmitted from the base station.

11. The position information processing device according to claim 1, wherein the positioning section estimates the position of the position information processing device based on strengths of a plurality of radio signals received from the plurality of base stations and the base station information.

12. The position information processing device according to claim 1, wherein the positioning section estimates the position of the position information processing device based on a weighting factor, wherein the weighting factor is calculated based on a distance between the position information processing device and each of the plurality of base stations, and wherein the distance is measured based on signal strengths of a plurality of radio signals received from the plurality of base stations.

13. The position information processing device according to claim 12, wherein the weighting factor is inversely proportional to the calculated distance.

14. A position information processing method comprising:

in a mobile terminal:

storing base station information including position information, a MAC address, and an auxiliary identifier;

acquiring, by utilizing both a MAC address of a base station and an auxiliary identifier acquired by reception of a radio signal transmitted from the base station, position information of the base station from the stored base station information;

estimating a position of the mobile terminal based on the acquired position information of the base station; and wherein the position of the mobile terminal is estimated as a position of a center of positions of a plurality of base stations each having a signal strength of radio signal, received by the mobile terminal, greater than a threshold.

15. A non-transitory computer readable medium having stored thereon, a set of computer-executable instructions for causing a computer to perform a position information processing method of a mobile terminal, the position information processing method comprising:

storing base station information including position information, a MAC address, and an auxiliary identifier;

acquiring, by utilizing both a MAC address of a base station and an auxiliary identifier acquired by reception of a radio signal transmitted from the base station, position information of the base station from the stored base station information;

estimating a position of the mobile terminal based on the acquired position information of the base station; and wherein the position of the mobile terminal is estimated as a position of a center of positions of a plurality of base stations each having a signal strength of radio signal, received by the mobile terminal, greater than a threshold.

16. A position information processing system comprising:
a mobile terminal which includes
a reception section which receives a radio signal transmitted from a base station, a MAC address acquisition section which acquires a MAC address of the base station from the radio signal received by the reception section, and an auxiliary identifier acquisition section which acquires an auxiliary identifier based on a result of reception by the reception section of the radio signal; and a position information processing device which includes a base station information storage section which stores base station information including position information, a MAC address, and an auxiliary identifier, a communication section which receives the MAC address of the base station and the auxiliary identifier from the mobile terminal, a position information acquisition section which acquires, by utilizing both the MAC address of the base station and the auxiliary identifier received by the communication section, position information of the base station from the base station information stored in the base station information storage section, and a positioning section which estimates a position of the mobile terminal based on the position information of the base station acquired by the position information acquisition section, wherein the position of the mobile terminal is estimated as a position of a center of positions of a plurality of base stations each having a signal strength of radio signal, received by the mobile terminal, greater than a threshold.

17. A position information processing device comprising:

a base station information storage section which stores base station information including position information, a MAC address, and an auxiliary identifier;

a position information acquisition section which acquires position information of a base station by utilizing both a MAC address of the base station and an auxiliary identifier acquired by reception of a radio signal transmitted from the base station such that the position information is acquired from the base station information storage section only when both the MAC address of the base station and the acquired auxiliary identifier match those stored in the base station information storage section; and a positioning section which estimates a position of the position information processing device based on the position information of the base station acquired by the position information acquisition section, where the positioning section estimates the position of the position information processing device based on a weighting factor, wherein the weighting factor is calculated based on a distance between the position information processing device and each of a plurality of base stations, and wherein the distance is measured based on signal strengths of a plurality of radio signals received from the plurality of base stations.

* * * * *